United States Patent [19]
Sakamoto et al.

[11] Patent Number: 5,057,465
[45] Date of Patent: Oct. 15, 1991

[54] CERAMIC MATRICES REINFORCED WITH SIC, SI$_3$N$_4$ OR SIALON FIBERS HAVING A COATING OF C, B OR BN CONTAINING SIC OR SI$_3$N$_4$

[75] Inventors: Hiroshi Sakamoto; Tadahiko Miyoshi, both of Hitachi, Japan

[73] Assignee: Hitachi, Ltd., Tokyo, Japan

[21] Appl. No.: 453,925

[22] Filed: Dec. 20, 1989

Related U.S. Application Data

[63] Continuation of Ser. No. 60,335, Jul. 8, 1986, abandoned.

[30] Foreign Application Priority Data

Jul. 10, 1985 [JP] Japan ................................ 60-150248

[51] Int. Cl.$^5$ ...................... C04B 35/52; C04B 35/02; B32B 9/00
[52] U.S. Cl. ......................................... 501/90; 501/95; 501/96; 501/97; 428/408; 428/902; 428/297; 428/366; 428/367; 428/368; 428/378
[58] Field of Search ............... 428/367, 366, 368, 378, 428/408; 501/95, 96, 97, 90

[56] References Cited

U.S. PATENT DOCUMENTS

| | | | |
|---|---|---|---|
| 4,131,697 | 12/1978 | Randon et al. | 427/249 |
| 4,275,095 | 6/1981 | Warren | 427/228 |
| 4,397,901 | 8/1983 | Warren | 428/101 |
| 4,405,685 | 9/1983 | Honjo et al. | 428/368 |
| 4,605,588 | 8/1986 | Simpson et al. | 428/288 |
| 4,642,271 | 2/1987 | Rice | 428/698 |

Primary Examiner—George F. Lesmes
Assistant Examiner—James D. Withers
Attorney, Agent, or Firm—Antonelli, Terry, Stout & Kraus

[57] ABSTRACT

The present invention provides fiber-reinforced ceramics containing at least one member of fibers and whiskers as distributed in a sintering ceramic matrix, which comprises the ceramic matrix being composed mainly of SiC, Si$_3$N$_4$ and Si$_{6-z}$Al$_z$O$_z$N$_{8-z}$, where $0<z\leq 4$, the fibers and the whiskers being composed of at least one of SiC, Si$_3$N$_4$ and Si$_{6-z}$Al$_z$O$_z$N$_{8-z}$, where $0<z\leq 4$, and a coating film of C, B or BN being provided on the surfaces of the fibers and the whiskers. The fiber-reinforced ceramics have a high fracture toughness, $K_{1c}$, and a high bending strength, particularly $K_{1c}$ of at least 10 MN/m$^{3/2}$ and a bending strength of at least 50 kg/mm$^2$.

19 Claims, 14 Drawing Sheets

5μm

100μm

CERAMIC MATRICES REINFORCED WITH SIC, SI$_3$N$_4$ OR SIALON FIBERS HAVING A COATING OF C, B OR BN CONTAINING SIC OR SI$_3$N$_4$

This application is a continuation application of application Ser. No. 07/060,335, filed July 8, 1986, now abandoned.

BACKGROUND OF THE INVENTION

1. Field of the Invention

This invention relates to fiber-reinforced ceramics suitable for structural parts, etc.

2. Description of the Prior Art

Attempts to apply ceramics to structural parts, mechanical parts, etc. as substitutes for metals have been actively made by virtue of characteristics of ceramics, such as a high heat resistance, a high oxidation resistance, a high strength, a high attrition resistance, etc. Among the ceramics, particularly silicon-based ceramics such as Si$_3$N$_4$, Si$_{6-z}$Al$_3$O$_z$N$_{8-z}$($0<z\leq4$), SiC, etc. have been regarded as important owing to a high strength at an elevated temperature and a distinguished oxidation resistance, but have such a disadvantage as a high brittleness.

To overcome the brittleness of ceramics and improve the fracture toughness, methods for dispersing fibers of high tenacity into the ceramics to give the ceramics fiber reinforcement have been proposed. The methods are particularly effective for glass matrix, as disclosed in J. J. Brennan; K. M. Prewo, J. Mater. Sci. 17 2371–2383 (1982), and materials whose fracture toughness exceeds 15 MN/m$^{3/2}$ in terms of K$_{1c}$ have been known. However, the materials based on the glass matrix generally have a lower heat resistance than the ceramics, and have such a disadvantage that they are deformed under a load at an elevated temperature for a prolonged time.

On the other hand, fiber-reinforced ceramics have not had a sufficiently high fracture toughness, as disclosed, for example, in Hibashi Sunshine Journal Vol. 3, No. 4 (1982), pages 20-28, and have had a problem in the mechanical reliability.

SiC fiber-reinforced ZrO$_2$, mullite, and cordierite are reported in B. A. Bender: Proc. of 8th Annual Conference on Composites and Advanced Ceramic Materials, pages 513–529, January 15 to 18 (1984). Some of these ceramics have a relatively high fracture toughness, but their strength is about 80 to about 180 MPa, which is rather small for the ceramics. Furthermore, it seems that since ceramics are oxides, their strength will be lowered by softening at an elevated temperature. It is mentioned in the said report that there is a reaction phase in a film state composed of carbon at the boundaries between the 30 wt.% BN-containing mullite and the SiC fibers, where the reaction phase does not contribute to an improvement of toughness and thus the toughness of the ceramics is low.

Furthermore, it is mentioned in the same report that the SiC fiber-reinforced glass has a low strength, and even if it has a high strength, the strength will be lowered by softening at an elevated temperature. That is, the desired ceramics having a high strength at an elevated temperature and a high toughness for structural materials have not been available.

Examples of utilizing whiskers are disclosed in Japanese Patent Application Kokai (Laid-open) No. 59-54680, where ceramics less susceptible to strength deterioration up to a high temperature can be obtained by integrating SiC whiskers throughout Si$_3$N$_4$. However, the toughness of ceramics cannot be considerably improved only by the whiskers, mainly because distribution of whiskers becomes uneven if 25% by volume or more of whiskers are contained within the ceramic matrix, and consequently the density is considerably lowered. That is, normal sintered products cannot be obtained This is also because the diameters of commercially available SiC whiskers obtained according to a gas phase process are as small as 0.5–1.0 μm and are not so different from the particle size of the ceramic matrix, and consequently the ability of the whiskers to absorb the cracking is low.

It is also reported in M. W. Lindly; D. J. Godfrey: Nature 229, 192–193 (1971) that Si$_3$N$_4$ ceramics reinforced by silicon carbide fibers having diameters of 80 to 100 μm have a relatively large fracture energy, but have a strength of 127 MPa (about 13 kg/mm$^2$), which is low for the ceramics, because Si$_3$N$_4$ is sintered according to a reaction sintering process and pores remain pores in the Si$_3$N$_4$. In this case, W wires chemically vapor-deposited (CVD) with SiC are used as fibers, and it seems that W reacts with SiC when the ceramics are used at an elevated temperature for a long time, deteriorating the fiber characteristics.

SUMMARY OF THE INVENTION

An object of the present invention is to provide fiber-reinforced ceramics having a high strength at an elevated temperature and a high toughness suitable for structural material parts requiring a high heat resistance and a high mechanical strength

STATEMENT OF THE INVENTION

The present invention is based on a finding that in integrated ceramics containing at least one of ceramic fibers and whiskers as distributed in a sintered ceramic matrix, a coating film is provided on the surfaces of the ceramic fibers and the whiskers to prevent direct contact with the ceramic matrix, whereby the fracture toughness can be largely improved.

It has been further found that, when SiC, Si$_3$N$_4$, or Si$_{6-z}$Al$_z$O$_z$N$_{8-z}$ ($0<z\leq4$) is used as ceramic matrix, fibers or whiskers, it is preferable to use a C film, a B film, or a BN film as the coating film.

As a result of studies made by the present inventors, it has been clarified that:

(1) As materials satisfying stable use at an elevated temperature, for example, 1,000° C. or higher, for a long time and also requirements for a high strength and a high toughness, ceramics containing ceramic fibers or whiskers dispersed in a ceramic matrix are most distinguished, and specifically SiC, Si$_3$N$_4$ or Si$_{6-z}$Al$_z$O$_z$N$_{8-z}$ ($0<z\leq4$) is preferable.

(2) In the conventional fiber-reinforced ceramics, the matrix contacts and reacts with the fibers or the whiskers at the sintering of matrix ceramics, and consequently the fracture toughness cannot be sufficiently increased.

That is, when the matrix directly contacts the fibers, or the whiskers at the sintering of matrix ceramics, there takes place reaction therebetween, whereby not only the strength of fibers or whiskers is lowered, but also the fibers or whiskers inhibit the sintering and shrinkage of the matrix because the fibers or whiskers fail to undergo sintering and shrinkage at the sintering of the matrix, or there develop large strains at the boundaries between the matrix and the fibers or whiskers. Cracks may develop in the matrix due to the strains. Thus, the strength or fracture toughness of the fiber-reinforced ceramics is not sufficiently increased.

A factor particularly for largely improving the fracture toughness in the fiber-reinforced ceramics is an energy consumption by withdrawal of the fibers or whiskers at the fracture. When the fibers or whiskers are in tight adhesion to the matrix, such withdrawal effect is hard to obtain, and rather the matrix and the fibers or whiskers are fractured together. Thus, the fracture toughness cannot be sufficiently increased.

In the present fiber-reinforced ceramics, a coating film is provided on the surfaces of fibers or whiskers to prevent direct contact with the matrix, whereby deterioration of the fibers or whiskers at the sintering of matrix ceramics or development of strains at the boundaries between the matrix and the fibers or whiskers due to the sintering shrinkage is prevented. Furthermore, since the matrix is not in direct contact with the fibers or whiskers, peeling takes place always at these boundaries, and the fibers or whiskers can be withdrawn.

Thus, the present fiber-reinforced ceramics can be given a high fracture toughness.

It is necessary that the coating film to be provided on the surfaces of fibers or whiskers, should not too firmly adhere to the matrix ceramics during sintering, and a coating film material depends upon a matrix material. For example, when SiC having an expected use particularly at an elevated temperature, such as 1,500° C. or higher, is used as a matrix material, it is preferable to use a material composed mainly of BN as the coating film material. When $Si_3N_4$ or $Si_{6-z}Al_zO_zN_{8-z}$ ($0<z\leq 4$) is used as a matrix material in applications requiring a particularly high strength though the temperature is as low as about 1,200° C., it is preferable to use a material composed mainly of B, BN or C as a coating film material. When C is used as a coating film material, the fibers or whiskers can be withdrawn with an appropriate force, and thus have a good withdrawal effect, and particularly the fracture toughness can be readily increased. On the other hand, when B or BN is used as a coating film material, the ceramics are particularly stable against the heat treatment in the air.

These coating films can be formed on the fibers or whiskers according to a gas phase process such as CVD, vapor deposition, sputtering, etc., or according to a wet process such as coating or decomposition of a solution, resin, etc. Furthermore, it is desirable that the coating film has a thickness of 0.1 to 5 μm, preferably 0.1 to 1 μm. If the coating film is too thin, the inhibition of reaction with the matrix, removal of the strains or the withdrawal effect cannot be fully obtained whereas, when the coating film is too thick, the boundaries between the matrix and the fibers or whiskers become too weak, and the strength required for the fiber-reinforced ceramics cannot be fully obtained.

It is essential that the fibers or whiskers dispersed in the sintered matrix must be stable even at the sintering temperature of the matrix ceramics. Specifically, in the case of a matrix composed mainly of SiC, materials composed mainly of SiC can be used as fibers or whiskers, and in the case of a matrix composed mainly of $Si_3N_4$ or a SiAlON system, materials composed mainly of $Si_3N_4$ can be used as fibers or whiskers. Among others, C or SiC fibers chemically vapor deposited (CVD) with SiC can maintain a high strength up to a high temperature, and can be withdrawn not only from the boundaries between the matrix and the fibers at the fracture, but also from the boundaries between the C fibers or SiC fibers and the SiC coating films within the fibers, and are particularly effective for increasing the toughness. For example, it is particularly preferable to use fibers prepared by chemically vapor depositing SiC or $Si_3N_4$ onto long fibers made from an organosilicon compound, because the toughness of the fiber-reinforced ceramics can be increased, and distinguished characteristics can be obtained in the heat resistance and the oxidation resistance.

In the present invention, fibers or whiskers whose aspect ratio (ratio of long axis to short axis, i.e. the ratio of the length of fiber or whisker to the maximum width of the fiber or whisker in a direction perpendicular to the longitudinal direction) is 20 or more are effective for energy consumption by the withdrawal. The content of fibers or whiskers is 15 to 50% by volume when they are dispersed at random in the matrix, and 5 to 35% by volume when the long axis directions of fibers or whiskers are arranged one-dimensionally, or two-dimensionally, or three-dimensionally, and ceramics having particularly high strength and high toughness can be obtained in these ranges.

When ceramics are used for the structural parts requiring a particularly high reliability, such as turbocharger rotors and gas turbine rotors, it is desirable that the fracture toughness is at least 10 $MN/m^{3/2}$ in terms of stress intensity factor $K_{1c}$. Even if there are defects of about 100 μm on the surface or in the interior of the ceramics in this case, the strength is more than about 30 $kg/mm^2$, which satisfies the allowable value in the strength design of said rotors, and there are no such problems as breakages during the operation. Even if there should be defects of more than 100 μm in the ceramics, the defects can be readily detected nondestructively on the production line by such means as X-ray transmission, ultrasonic flaw detection, visual inspection, etc. and can be removed. Thus, so long as ceramics having $K_{1c}$ of 10 $MN/m^{3/2}$ or more is used, breakage accidents due to the interior defects or surface flaws inherent to the ceramics can be prevented, and the reliability of structural parts of ceramics can be considerably increased. Furthermore, ceramics having a large $K_{1c}$ require much energy for development of cracks existing in the ceramics, and consequently the crack development can be inhibited. That is, the characteristics of ceramics can be kept stable and reliable for a long time.

The energy for crack development in the ceramics having a $K_{1c}$ of 10 $MN/m^{3/2}$ or more is 3 to 10 times as much as that in the conventional ceramics having a $K_{1c}$ of about 3 to about 6 $MN/m^{3/2}$, and thus the structural parts of high strength and high reliability can be obtained.

The present ceramics particularly in the desirable range can have a $K_{1c}$ of 15 $MN/m^{3/2}$ or more. The energy necessary for fracturing such ceramics is considerably large, for example, 6 to 25 times as much as that of the conventional ceramics, and thus the ceramics of particularly high strength and high reliability can be obtained.

The present inventors have tried to toughen $Si_3N_4$ or $Si_{6-z}Al_zO_zN_{8-z}$ ($0<z\leq 4$) sinterable at 1,500° to 1,800° C. as matrix ceramics with fibers. The present inventors have investigated reactivities of the matrix ceramics with various substances and have found that C fibers and SiC fibers fail to react with sintered products at the sintering. The C fibers have largely different coefficients of thermal expansion in the long axis direction and the short axis direction, where that in the long axis direction is substantially equal to that of $Si_3N_4$, whereas that in the short axis direction is much larger. Thus, the C fibers thermally expanded at the sintering shrink at the cooling, forming clearances between the C fibers and the matrix ceramics. That is, no forces are required for the withdrawal of the fibers, and the strength is lowered. Thus, the C fibers are not preferable.

On the other hand, the SiC fibers have a coefficient of thermal expansion substantially equal to that of the sintered product, and have been found effective for giving a higher strength and a higher toughness to the sintered product. That is, the present inventors have found that, when the SiC fibers are integrated into the matrix ceramics, the withdrawal can be made with an appropriate force, and thus the toughness can be largely increased.

It is necessary that the diameter of SiC fibers be at least 5 times as large as the particle size of matrix ceramics. Unless the fibers have such diameter, they have no sufficient mechanical strength and will be flexed at the withdrawal, giving no sufficient effect upon the improvement in toughness. If the diameter is too large, cracks are liable to develop at the boundaries between the fibers and sintered product due to the difference in the thermal expansion, and this is not preferable. Specifically, the preferable diameters of the fibers are in a range of 10 to 200 $\mu$m.

To attain the sufficient withdrawal effect, it is preferable that the length of the fibers is at least 30 times as large as the diameter of fibers. It is necessary that the sintered product has a sintering density of at least 95%. If the sintering density of the sintered product is lower, the strength of the sintered product will be lowered, and the force to withdraw the fibers will be much lowered. That is, the integrated sintered product cannot have sufficient strength and toughness.

It is preferable that the distances between the fibers as arranged are 0.5 to 2 time as large as the fiber diameter. If the distances between the fibers as arranged are more than twice the diameter of fibers, the toughness is not remarkably improved, whereas the distances are less than 0.5 times the diameter, the withdrawal of fibers takes place less, and cracks are interconnected between the adjacent fibers and develop along the fibers. That is, the toughness is less improved. Thus, it is desirable that the effective distances between the fibers as arranged for the improvement of toughness is 0.5 to 2 times, particularly 1.0 time the diameter of fibers.

At least one of sintered SiC and $Si_3N_4$ can contain 1 to 20% by volume of at least one of $Al_2O_3$ and $Y_2O_3$ as a sintering aid. The sintering aid can improve the sintering density of SiC or $Si_3N_4$.

Furthermore, in the present invention an integrated sintered product capable of sufficiently withstanding the use at an elevated temperature in the air can be obtained by providing a C film, a B film or a BN film, each containing SiC or $Si_3N_4$, on the surfaces of fibers or whiskers. Distinguished characteristics can be obtained when the film contains 10 to 50% by mole of SiC or $Si_3N_4$. When the SiC or $Si_3N_4$ content of the film exceeds 50% by mole, the film reacts with silicon nitride or $Si_{6-z}Al_zO_zN_{8-z}$ ($0<z\leq4$) as the matrix, and thus the sufficient withdrawal effect cannot be obtained, whereas the SiC or $Si_3N_4$ content of the film is less than 10% by mole, the carbon content is too high, and the film cannot withstand the use at an elevated temperature for a long time. When the film has a thickness of 0.1 to 5 $\mu$m, a good effect can be obtained. If the film is too thin, no effect is obtained, whereas, if the film is too thick, the effect of fiber reinforcement is lost.

The SiC or $Si_3N_4$ content of the film can be readily assayed by measuring a ratio of C peak to Si peak of the film, for example, according to Micro Augar Spectroscopy. According to one assay example, a peak ratio of C to Si (C/Si) of a 100% SiC film is 0.416, and a peak ratio (C/Si) of C-SiC mixed film is 1.923. This corresponds to about 22% by mole of SiC present in the mixed film.

PREFERRED EMBODIMENTS OF THE INVENTION

Example 1

Predetermined amounts of $Si_3N_4$, AlN, $SiO_2$ and $Al_2O_3$ having particle sizes of 0.5 to 2 $\mu$m were mixed to prepare powdery mixtures having compositions $Si_{6-z}Al_zO_zN_{8-z}$ (z: 0, 0.5 and 4). Then, 0.5 to 5% by volume of $Y_2O_3$ having particle sizes of 1 to 2 $\mu$m and an appropriate amount of an aqueous 5% polyvinyl alcohol solution were added thereto, and then the respective powdery mixtures were sieved to adjust particle sizes.

On the other hand, SiC was chemically vapor deposited onto C fibers having a diameter of 35 $\mu$m to obtain fibers having a diameter of 140 $\mu$m and furthermore a C film was chemically vapor deposited on the thus obtained fibers (the ultimately obtained fibers will be hereinafter referred to as "SiC fibers").

The SiC fibers were cut to a length of 50 mm, and arranged at equal distances in one direction. The distances in the thickness direction was adjusted by alternately placing the sieved powdery mixture and the SiC fibers into a mold, and changing the amount of the sieved powdery mixture. Then, the mold was pressed in a mold press under the pressure of 400 kg/cm² to obtain molding, 50 mm square ×6 mm thick, and the molding was placed in a graphite die and sintered in a nitrogen gas stream under 10 atmospheres in a hot press under the pressure of 300 kg/cm² at 1,750° to 1,900° C. The sintered product was cut in parallel to the arrangement direction of SiC fibers to obtain test pieces, 3 mm×4 mm×50 mm. The test pieces were polished by grinding, and a notch, 30 $\mu$m wide and 0.5 mm deep, was provided at the center at a right angle to the longitudinal direction of the test piece, and fracture toughness $K_{1c}$ was determined according to a single edge notched beam procedure.

Figure 1:
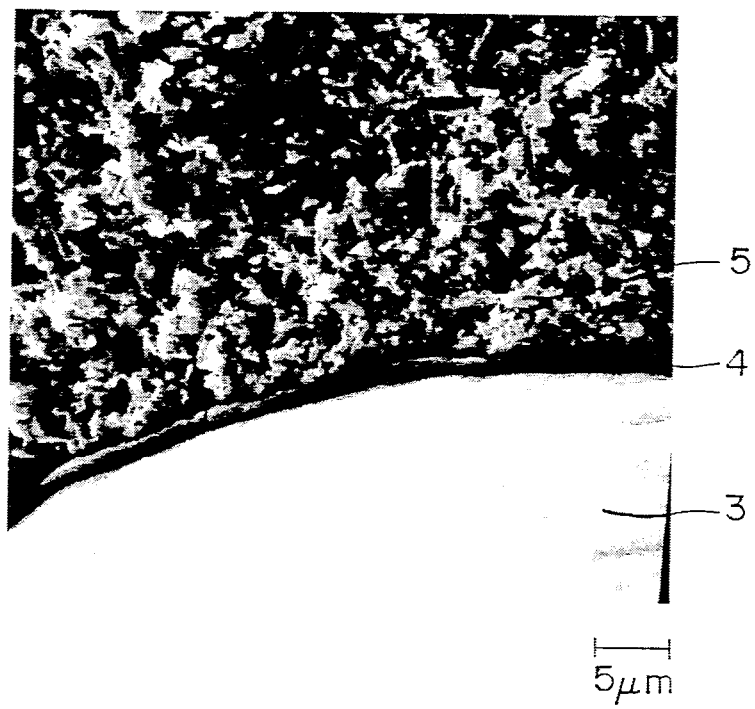
FIGS. 1 and 2 are microscopic pictures showing particle structures at the cross-sections of ceramics obtained according to the embodiments of the present invention.
Figure 2:
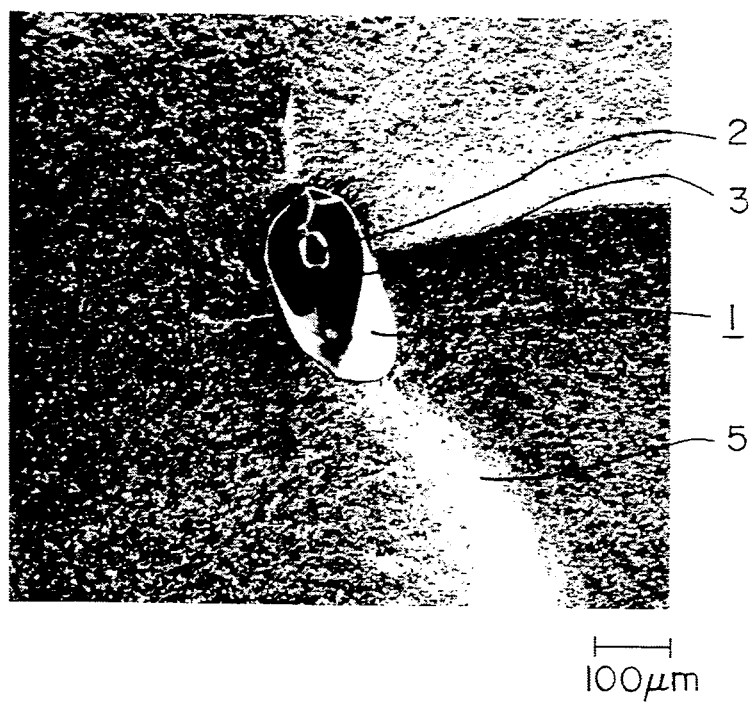

FIGS. 1 and 2 are microscopic pictures showing the microstructure at the fractured face of $Si_3N_4$ containing 20% by volume of SiC fibers. FIG. 1 shows formation of C film 4 on SiC3 formed by CVD, where the thickness of the C film is about 1 μm. FIG. 2 shows the state that SiC fiber 1 is withdrawn from $Si_3N_4$ matrix 5, where 2 is a carbon fiber.

Figure 3:
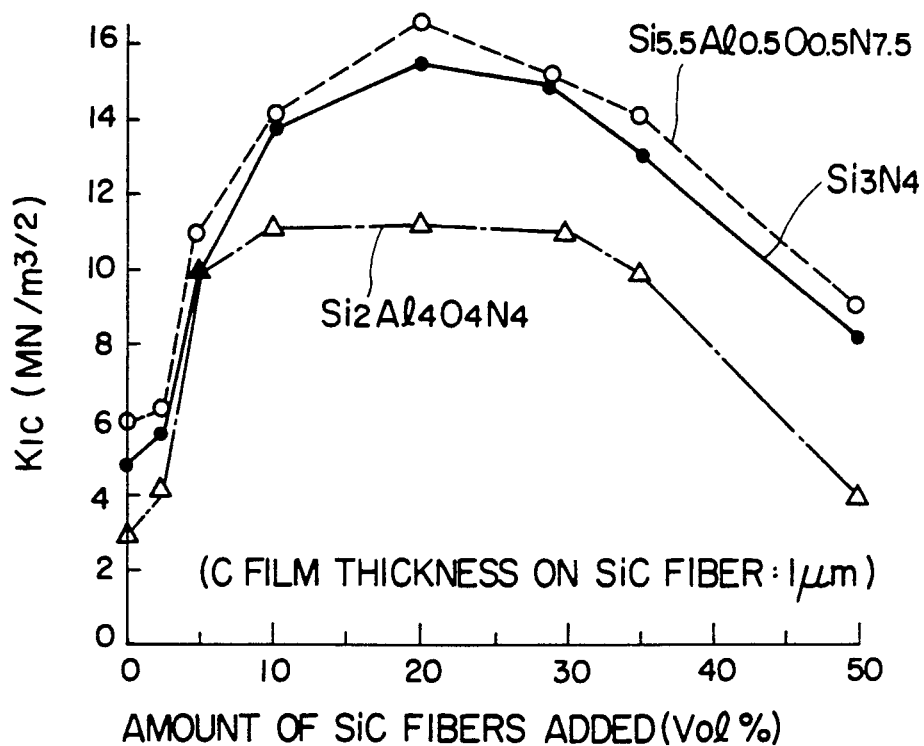
FIGS. 3 to 15 and 19 to 25 are diagrams showing characteristics of ceramics obtained according to the embodiments of the present invention.
Figure 4:
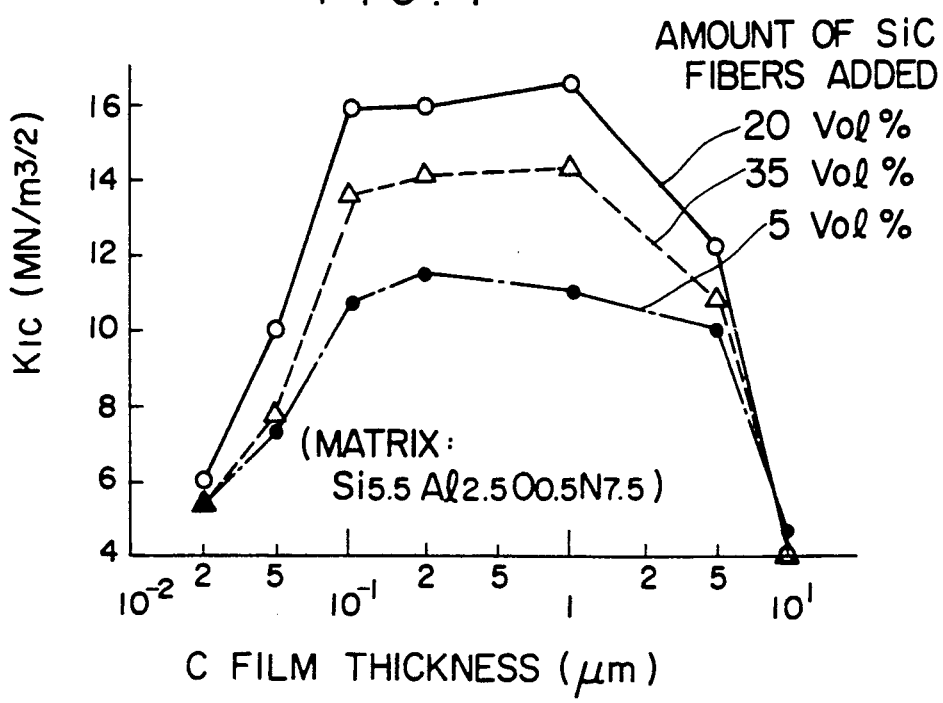

FIG. 3 shows relationships between the amount of SiC fibers added and $K_{1c}$, and FIG. 4 shows relationships between the C film thickness and $K_{1c}$.

4-point bending strength of test pieces whose amount of SiC fibers added shown in FIG. 3 were not more than 35% by volume was all 50 to 100 kg/mm², whereas the strength of test pieces whose amount of SiC fibers added was 50% by volume was as low as 25 kg/mm². As shown in FIG. 3, fracture toughness ($K_{1c}$) of about 10 MN/m^{3/2} or more was obtained with the amount of added SiC fiber ranging from 5 to 35% by volume. Furthermore, as shown in FIG. 4, when the thickness of the C film was 0.1 to 5 μm, a $K_{1c}$ of 10 MN/m^{3/2} or more was likewise obtained. Particularly, a $K_{1c}$ of about 14 MN/m^{3/2} or more was obtained with the amount of added SiC fibers ranging from 10 to 30% by volume and the thickness of the C film ranging from 0.1 to 1 μm.

Likewise, test pieces were prepared by alternately changing the arrangement direction of SiC fibers at 90° to each other to make a two-dimensional arrangement of the SiC fibers. These test pieces had a high $K_{1c}$ and a high bending strength with an amount of added SiC fibers ranging from 5 to 35% by volume, as in FIG. 3.

Figure 5:
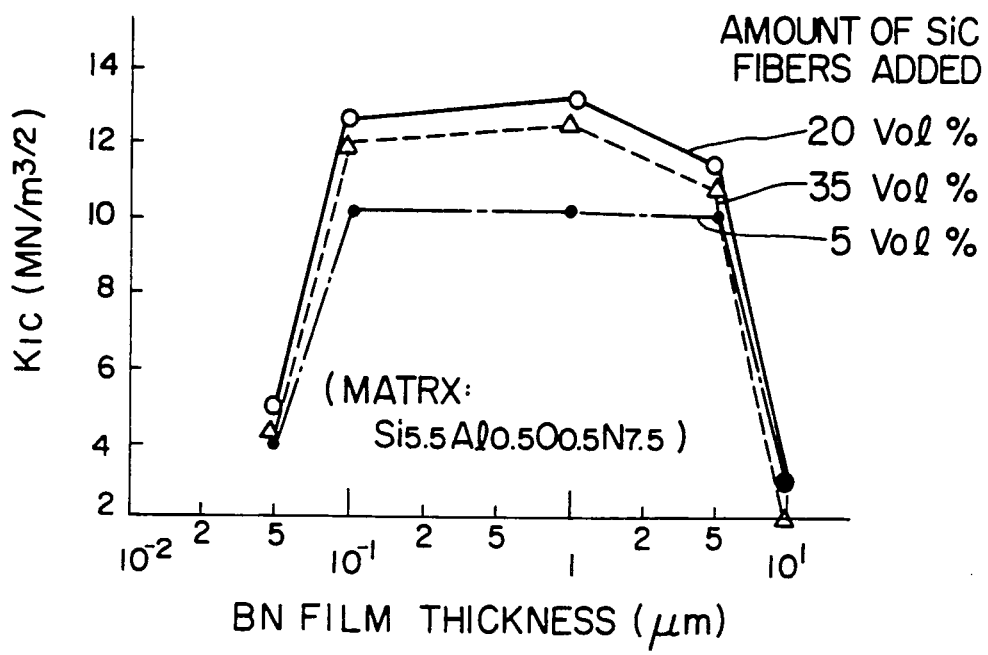

Furthermore, fiber-reinforced ceramics using SiC fibers obtained by chemically vapor depositing SiC onto the same C fibers as used above, and further sputtering BN thereon had a high $K_{1c}$ and a bending strength of 50 to 100 kg/mm² with an amount of added SiC fibers ranging from 5 to 35% by volume. FIG. 5 shows relationships between the thickness of BN film and $K_{1c}$ of the test pieces, where a $K_{1c}$ of 10 MN/m^{3/2} or more is obtained with a thickness of the BN film ranging from 0.1 to 5 μm.

Fiber-reinforced ceramics using SiC fibers having a diameter of about 50 μm prepared by chemically vapor depositing SiC on SiC long fibers having a diameter of about 10 μm (a BN film having a thickness of 1 μm being further formed on the surfaces of SiC fibers) in place of the foregoing fibers had a $K_{1c}$ of 10 MN/m^{3/2} or more. Their characteristics were not changed at all even by heat treatment at 1,000° C. in the air for 1,000 hours. The similar results were also obtained with the SiC fibers having a B film on the surfaces of SiC fibers in place of the BN film.

Example 2

Figure 6:
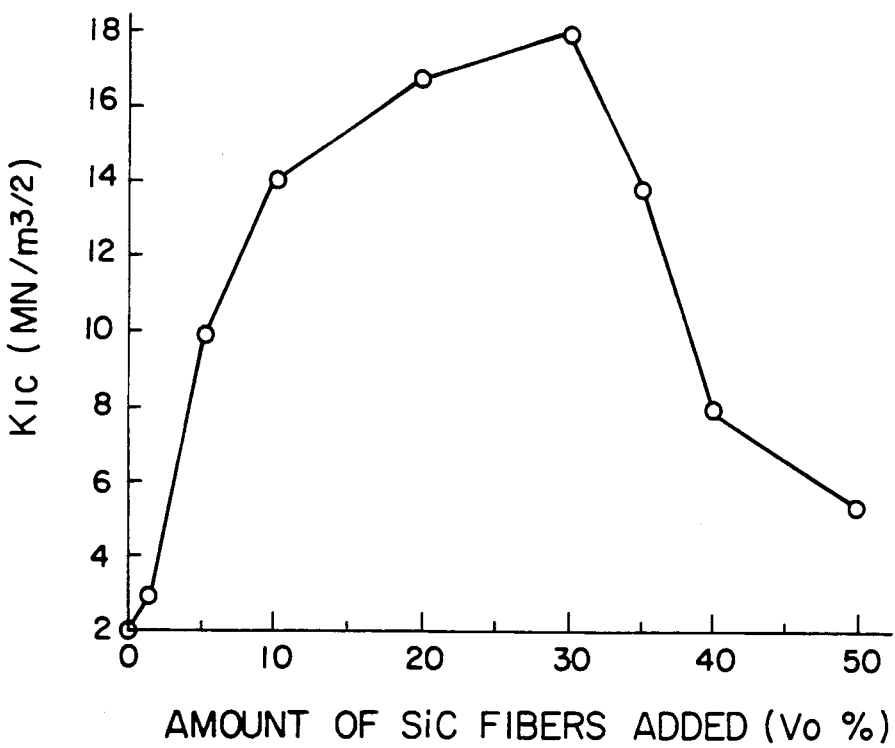

Fiber-reinforced ceramics containing SiC fibers in a three-dimensional arrangement in SiC matrix were prepared by chemically vapor depositing a C film having a thickness of 1 μm on the surfaces of SiC fibers having a diameter of 70 μm in the same manner as the SiC fibers of Example 1 and three-dimensionally weaving the SiC fibers, dipping the weavings in a 10% polycarbosilane solution in xylene, thermally decomposing the dipped weavings in an argon gas at 1,200° C., and repeating the foregoing dipping and thermal decomposition. FIG. 6 shows a relationship between $K_{1c}$ and the amount of SiC fibers added of the thus obtained test pieces. As is obvious from FIG. 6, a $K_{1c}$ of 10 MN/m^{3/2} or more can be obtained with an amount of added fibers ranging from 5 to 35% by volume, and particularly a $K_{1c}$ of 15 MN/m^{3/2} or more with 15 to 35% by volume.

Example 3

Commercially available SiC whiskers having a diameter of 0.5 to 1 μm were dipped in hydrofluoric acid to remove $SiO_2$ therefrom and washed, and then thoroughly dispersed in water, and groups of whiskers according to the length (aspect ratio) were each recovered by sedimentation. Then, each group of whiskers was heated in a mixed gas stream of $B_2H_6$ and $NH_3$ to deposit a BN film having a thickness of 0.1 to 0.2 μm on the surfaces of whiskers.

Then, 0.5 to 3% by volume of AlN and varied amounts of the thus obtained SiC whiskers were added to α-SiC powders having an average particle size of 0.5 μm and sintered in a hot press at 2,000° C. after mixing and molding.

Figure 7:
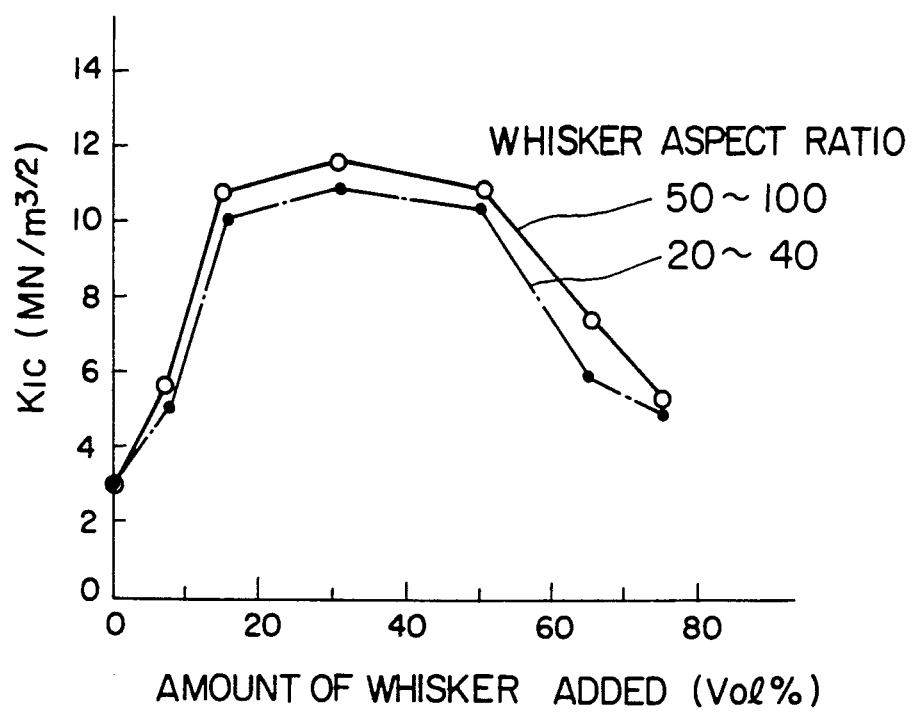
Figure 8:
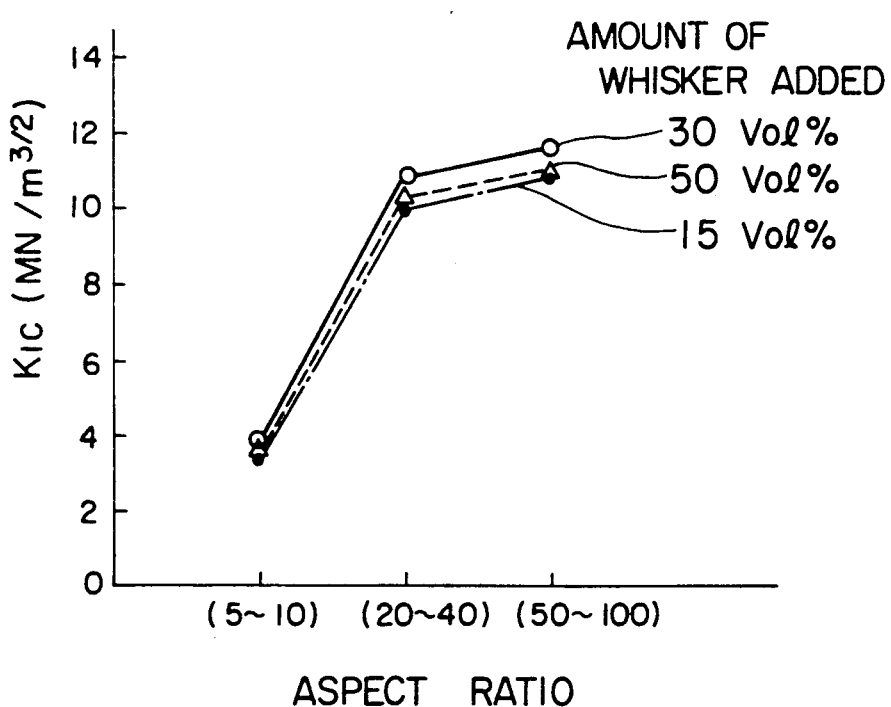

FIG. 7 shows relationships between the amount of added whiskers in the sintered products and $K_{1c}$, and FIG. 8 shows relationships between the aspect ratio of the whiskers and $K_{1c}$.

The test pieces having an amount of added whiskers of not more than 50% by volume among those shown in FIG. 7 had a bending strength of 40 to 80 kg/mm², but the bending strength of the test piece having an amount of added whiskers of 75% by volume was lowered to 15 kg/mm². As is obvious from FIG. 8, a $K_1$ of 10 MN/m^{3/2} or more could be obtained at an aspect ratio of 20 or more and in an amount of added whiskers of 15 to 50% by volume.

Example 4

Figure 9:
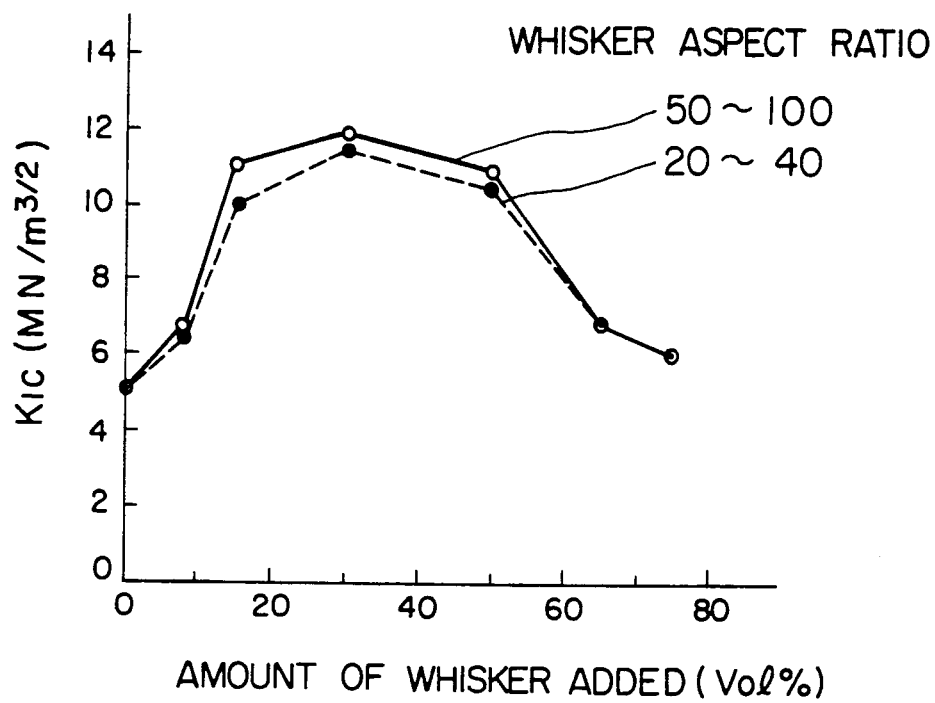
Figure 10:
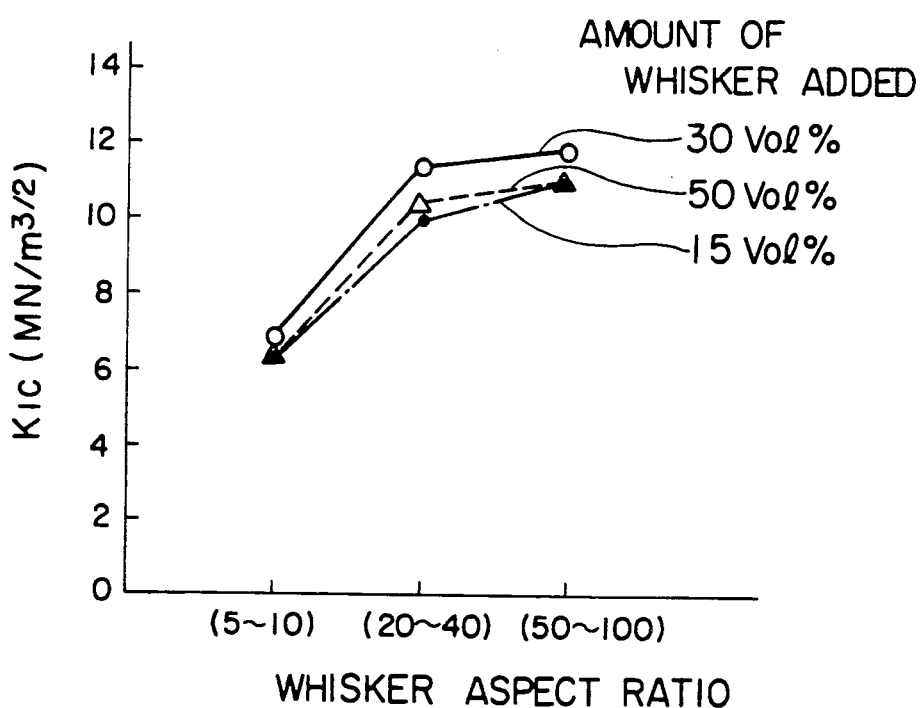

2% by volume of $Al_2O_3$ having particle sizes of 0.5 to 1 μm, 5% by volume of $Y_2O_3$ having particle sizes of 2 to 5 μm, and varied amounts of the SiC whiskers used in Example 3 were added to Si powders having an average particle size of 2 μm, and sintered in a hot press at 1,800° C. after mixing and molding FIG. 9 shows relationships between the amount of added whiskers and $K_{1c}$ of the sintered products, and FIG. 10 shows relationships between the aspect ratio of whiskers and $K_{1c}$.

Among the test pieces of FIG. 9, those having an amount of added whiskers of not more than 50% by volume had a bending strength of 50 to 80 kg/mm², whereas the bending strength of the test piece having an amount of added whiskers of 75% by volume was lowered to 15–20 kg/mm².

As is obvious from FIGS. 9 and 10, a $K_{1c}$ of 10 MN/m^{3/2} or more could be obtained at an aspect ratio of 20 or more in an amount of added whiskers of 15 to 50% by volume.

Example 5

Figure 11:
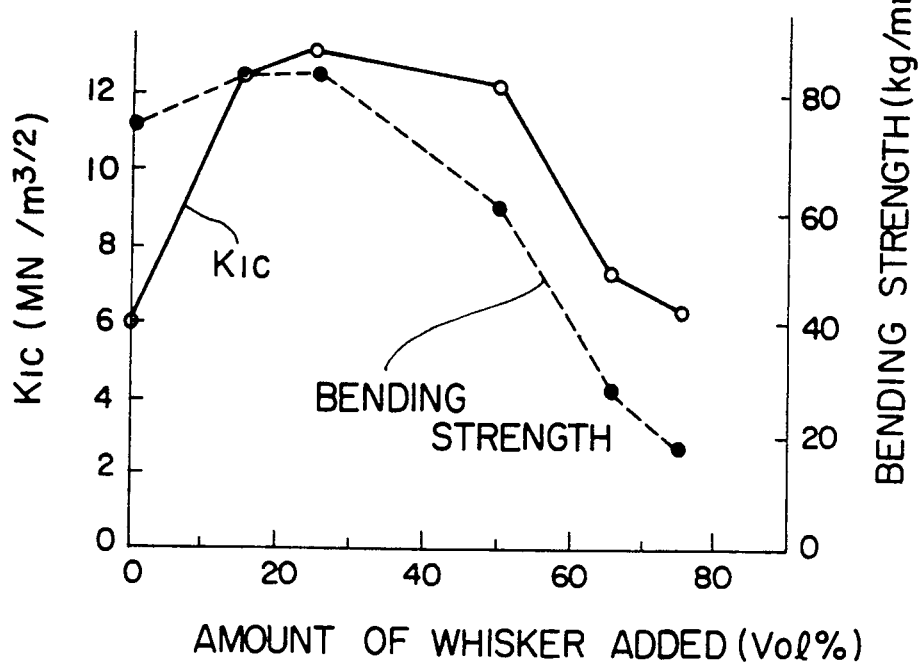

Commercially available $Si_3N_4$ whiskers (diameter : 0.3–1 μm; aspect ratio : 30–100), whose surfaces were coated with a C film having a thickness of about 0.2 μm in vacuum, were added to matrix $Si_{5.5}Al_{0.5}O_{0.5}N_{7.5}$ and sintered in an N gas stream at 1,800° C. in a hot press in the same manner as in Example 1. FIG. 11 shows relationships between the amount of added whiskers, $K_{1c}$ and bending strength of the sintered products. As is obvious from FIG. 11, a $K_{1c}$ of 10 MN/m^{3/2} or more and a bending strength of 60 kg/mm² or more could be obtained in an amount of added whiskers of 15 to 50% by volume.

As shown above, the present ceramics with a high toughness have a high fracture energy and thus have such characteristics as particularly high mechanical and heat shock resistances, as compared with the conventional ceramics.

Example 6

Predetermined amounts of Si powders having an average particle size of 2 μm and sintering aid powders were weighed out and thoughly mixed in a mixer. As the sintering aid, 2% by volume of $Al_2O_3$ having particle sizes of 0.5 to 1.0 μm and 3% by volume of $Y_2O_3$ having particle sizes of 2 to 5 μm were used in this Example. After an appropriate amount of an aqueous 5% polyvinyl alcohol solution was added to the powdery mixture, and the mixture was sieved through a 16-mesh screen to adjust the particle sizes.

On the other hand, SiC fibers having a diameter of 140 μm were prepared by chemically vapor depositing SiC onto C fibers having a diameter of 35 μm (a C film having a thickness of 1 μm was formed on the surfaces of SiC fibers). Jigs for making distances between parallel rows 0.3, 0.5, 1.0, 1.5, 2.0 and 2.5 times the diameter of the fibers as arranged were prepared and used to arrange the SiC fibers in a uniaxial direction. The distances in the thickness direction were adjusted by alternately placing the $Si_3N_4$ powdery mixture and the SiC fibers into a mold, and changing the amount of the powdery mixture, and then the mold was pressed in a press under a pressure of 400 kg/cm² to prepare a green body, 6 mm thick and 60 mm in diameter. The thus obtained green body was set in a well known graphite die in a hot press, and sintered in a nitrogen gas stream under a pressure of 300 kg/cm² at a maximum heating temperature of 1,800° C. The sintered product was cut in parallel to the SiC fibers to obtain test pieces, 3 mm wide×4 mm thick×36 mm long. The test pieces were polished by grinding, and a notch, 0.01 mm wide and 0.5 mm deep, was provided at the center at a right angle to the fibers to prepare test pieces for single edge notched beam (SENB) procedure. Then, fracture toughness $K_{1c}$ were determined.

Figure 12:
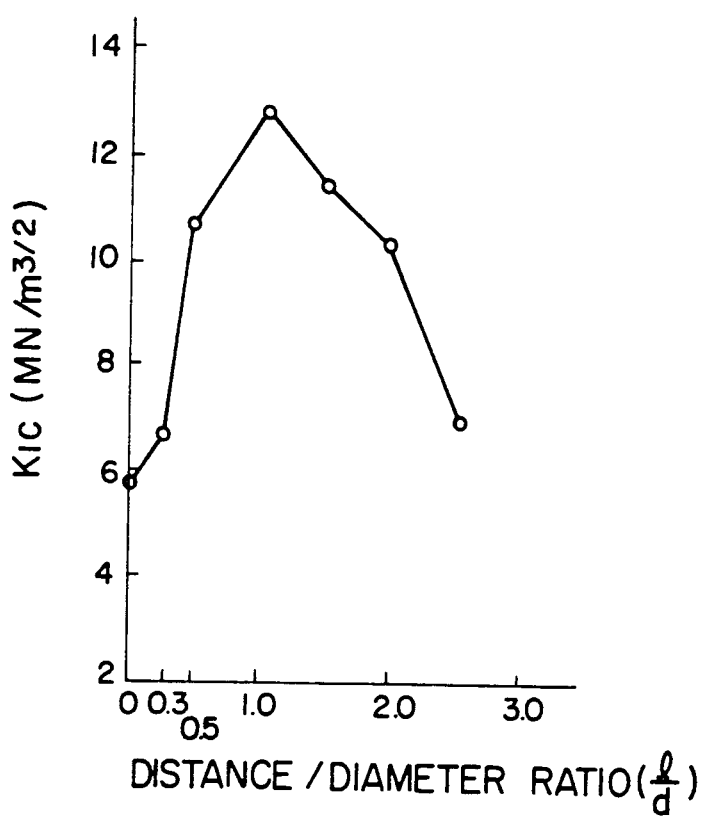

FIG. 12 shows a relationship between l/d and $k_{1c}$, where the axis of abscissa shows l/d, where d is a diameter of SiC fibers and l is the shortest length taken by $Si_3N_4$ between the fibers. As is obvious from FIG. 12, $K_{1c}$ shows a maximum value at l/d of 1.0. At l/d of 0.3, the amount of the fibers is so large that an effective improvement of the toughness is not obtained, but above l/d of 0.5, a remarkable increase in $K_{1c}$ is observed. Above l/d of 2.0, the amount of the fibers is too small, giving less effect on the toughness. Thus, it is preferable that l/d is in a range of 0.5 to 2.0, and particularly at 1.0 a good toughness can be obtained.

Likewise, test pieces having a two-dimensional arrangement of fibers were prepared by alternately changing the arrangement directions of the fibers at 90°, and they had a high $K_{1c}$ in a range of l/d =0.5-2.0.

Example 7

Figure 13:
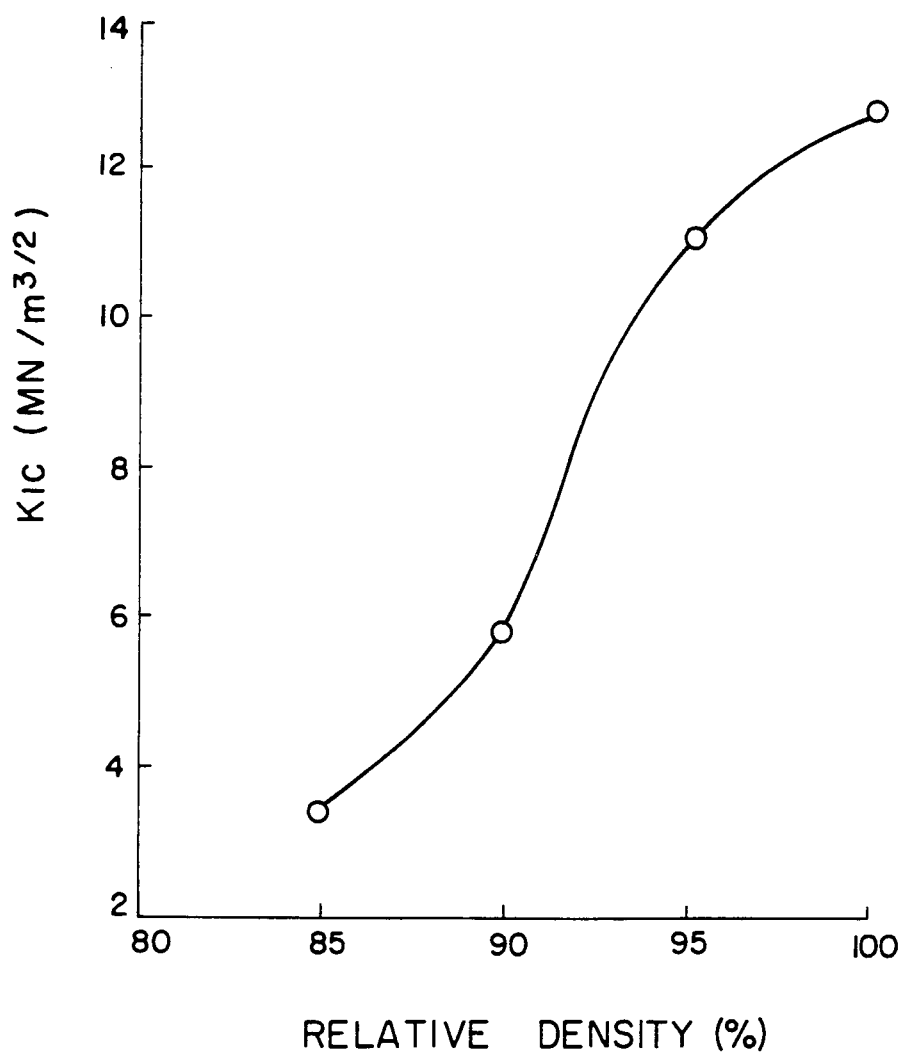

Green body of uniaxial arrangement at l/d of 1.0 was prepared in the same manner as in Example 6. By changing the sintering conditions, integrated sintered products of $Si_3N_4$-SiC fibers having different densities were prepared, and their fracture toughness $K_{1c}$ was determined in the same manner as in Example 6. FIG. 13 shows the results. Sintered products having a relative density of 93% or more had a $K_{1c}$ of 10 MN/m$^{3/2}$ or more, and thus the improvement of toughness of the sintered products were remarkable, but the effect was less at a lower relative density. That is, it is preferable that the relative density of integrated sintered product is 93% or more to increase the toughness by the fibers. The bending strength of test piece having the relative density of 100% in FIG. 13 was 80 kg/mm² in a range of room temperature to 1,100° C.

Example 8

Figure 14:
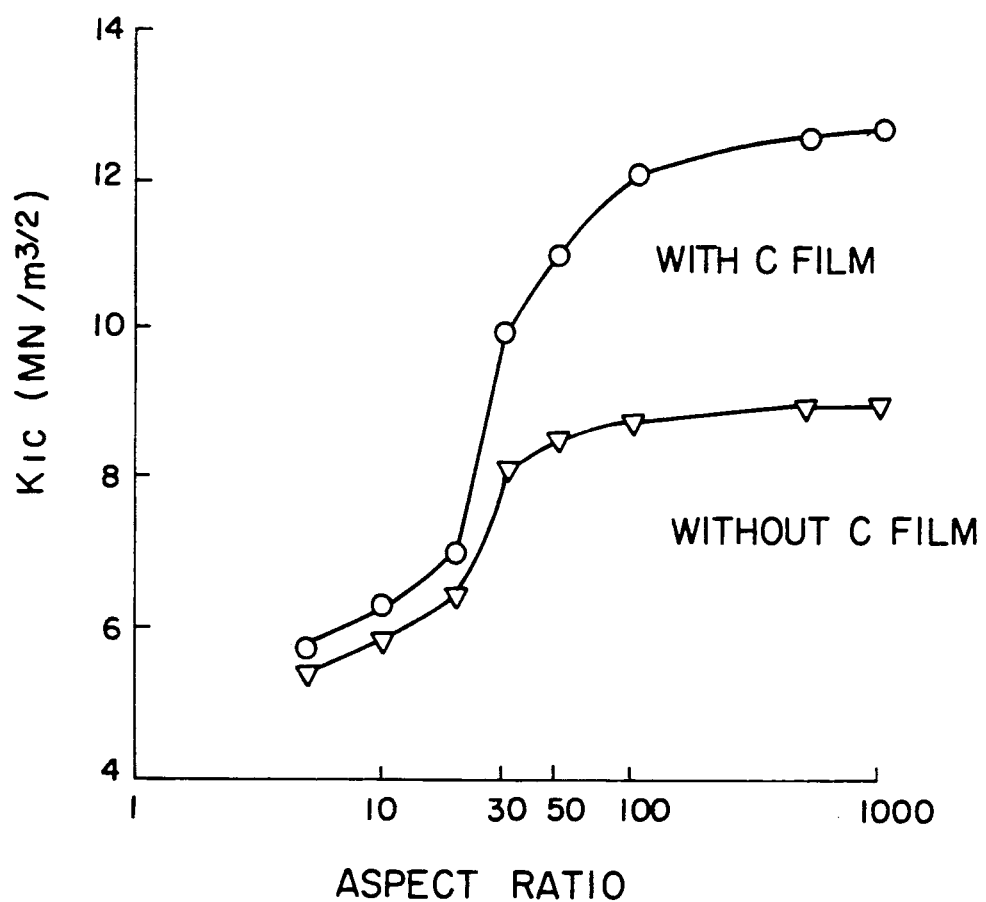

$Si_3N_4$ sintered products were prepared in the same manner as in Example 6. Different from Example 6, relationships between the aspect ratio and the fracture toughness ($K_{1c}$) of those using C film-formed SiC fibers and those using C film-free SiC fibers were investigated in this Example, where the relative density was 100%, and d/l was 1.0. FIG. 14 is a diagram showing these relationships.

To improve the toughness of ceramics by fibers, it is important that the fibers can be withdrawn from the ceramics. The SiC fibers having a C film on the surfaces can be readily withdrawn and thus the toughness of ceramics can be improved.

As is obvious from FIG. 14, $K_{1c}$ is considerably increased by the presence of the C films between the sintered ceramics and the fibers, whereas an increase in $K_{1c}$ is small when there is no C film. Observation of fractured surfaces reveals that the withdrawal of fibers coated with the C film takes place mainly at the boundaries between $Si_3N_4$ and SiC fibers, whereas the withdrawal takes place at the boundaries between SiC and C fibers where there is no C films. Fiber length necessary for the withdrawal is at least 30 times the diameter of the fibers, where a $K_{1c}$ of 10 MN/m$^{3/2}$ or more can be obtained.

Example 9

Figure 15:
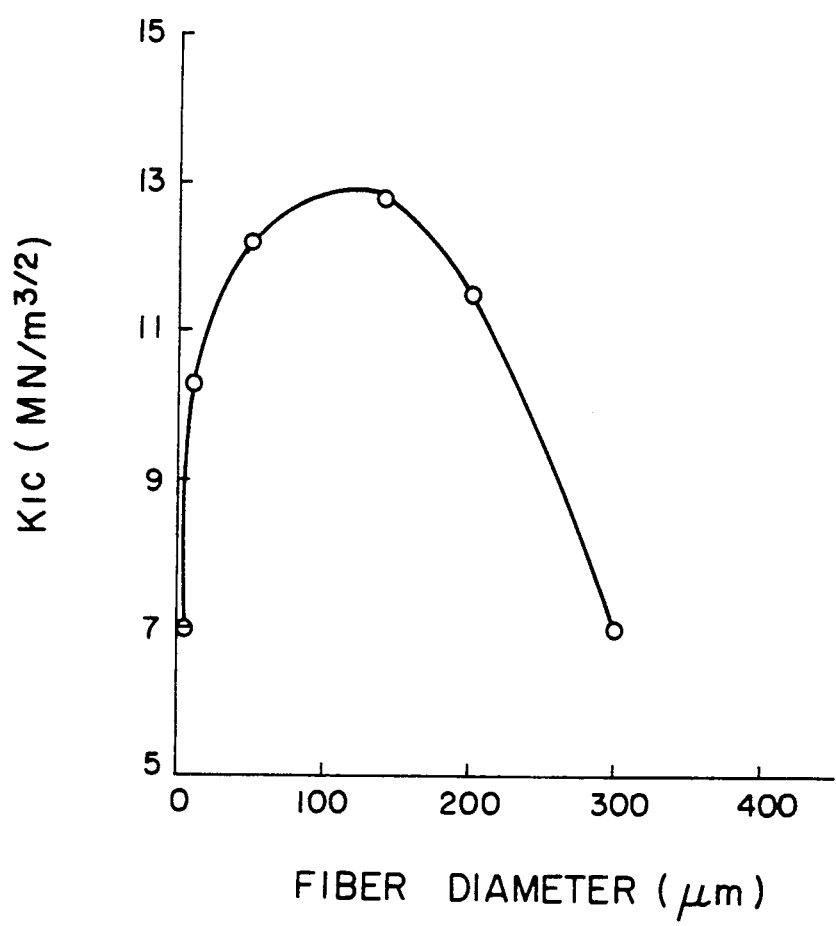

Integrated sintered products were prepared from $Si_3N_4$ powders having an average particle size of 1.5 μm and SiC fibers having diameters of 5.0, 10, 50, 140, 200 and 300 μm (all prepared by chemically vapor depositing SiC on C fibers and further providing C films having a thickness of 0.1 to 1 μm on the surfaces of SiC fibers) in the same manner as in Example 6, and their fracture toughness $K_{1c}$ were determined. Assemblies each of 10 or more SiC fibers having diameters of 0.5 μm or 10 μm were arranged because the arrangement of single fiber was impossible to make. The results are shown in FIG. 15. The $Si_3N_4$ sintered products had an average particle size of about 2.0 μm.

As is obvious from FIG. 15, a $K_{1c}$ of 10 MN/m$^{3/2}$ or more can be obtained when the fiber diameter is at least 5 times the particle size of matrix, that is, 10 μm or more. Above the fiber diameter of about 250 μm, the effect is drastically lost. To improve the toughness by the fibers, it is preferable to use the fibers having a diameter 5 to 100 times as large as the particle size of the matrix, that is, 10 to 200 μm.

Example 10

Figure 16:
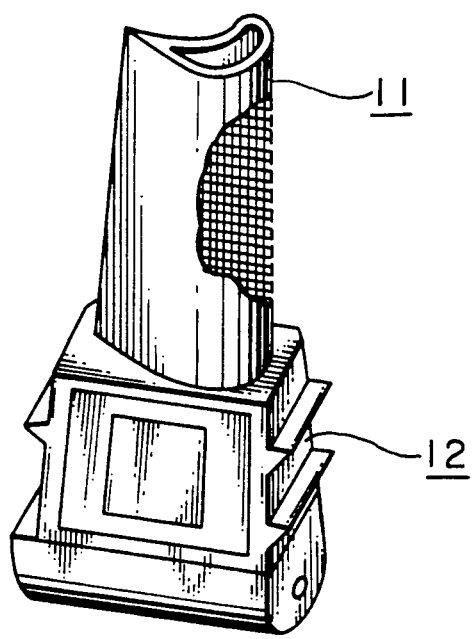
FIG. 16 is a perspective view of a gas turbine blade made from the fiber-reinforced ceramics according to the present invention.
Figure 17:
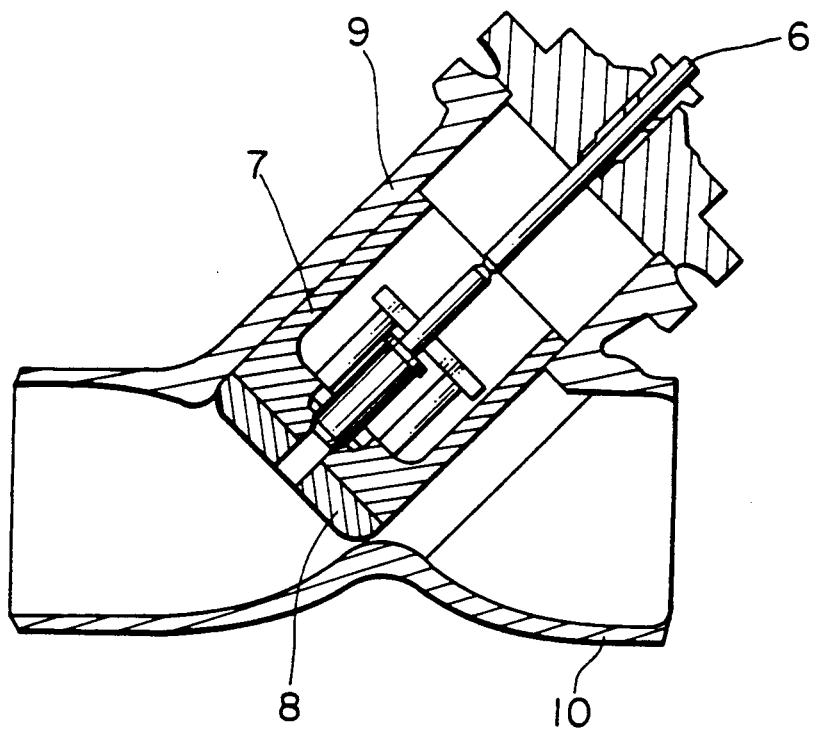
FIG. 17 is a cross-sectional view of a BWR main stream block valve made from the ceramics according to the present invention.

A gas turbine blade having a tip blade part 11 made from $Si_{5.5}Al_{0.5}O_{0.5}N_{7.5}$ having a structure where SiC fibers are two-dimensionally arranged, as shown in FIG. 16 was prepared by hot isotactic press in an Ar gas stream under 2,000 atmospheres at 1,800° C. A dovetail part 12 was composed of a Ni-based alloy (Udiment 700) made by lost wax, precision casting, and was jointed with the tip blade part 11 by a solder upon forming of a metallized layer to the ceramics. The blade was not damaged at all in the revolution test (100,000 rpm) in a gas at 1,350° C., a thermal shock test of alternately exposing to a hot gas and air, etc., and had a very high reliability. Furthermore, the said ceramics of high toughness was used as a disc head 8 in a block valve for a main steam pipe in the atomic power plant piping requiring a high attrition resistance or a high mechanical shock resistance, as shown in FIG. 17. The disc head 8 made from the ceramics is jointed to a disc 7 upon metallizing to the disc head 8 in the same manner as above. Numeral 9 is a cylinder, 6 a shaft, and 10 a pipe. The disc 7 is composed of Cr-Mo-V steel. The block valves of this Example are provided inside and outside the casing vessel in BWR.

In addition, the present ceramics can be also applied to gas turbine nozzles, rotor shafts, turbocharger blades, bearings, cutting tools (single point tool, saw, etc.), piping valves susceptible to shocks at the opening or closing of the valves, etc.

Example 11

Predetermined amounts of $Si_3N_4$ powders having an average particle size of 2 μm and sintering aid powders were weighed out and sufficiently mixed in a mixer. Various known sintering aids were available, and it was found as a result of investigations that appropriate amounts of $Al_2O_3$ and $Y_2O_3$ were in a range of 0.1 to 20% by volume where ceramics of particularly high strength could be obtained. In this Example, 2% by volume of $Al_2O_3$ having an average particle size of 0.5 to 1.0 μm and 3% by volume of $Y_2O_3$ having an average particle size of 2 to 5 μm were used, but it was found that good results could be obtained in the said range. After an appropriate amount of an aqueous 5% polyvinyl alcohol solution was added to the powdery mixture, the mixture was sieved through a 16-mesh screen to adjust the particle sizes.

On the other hand, SiC fibers having a diameter of 140 μm were prepared by chemically vapor depositing SiC onto carbon fibers having a diameter of 35 μm and a length of about 60 mm. The thus obtained SiC fibers were dipped in a solvent containing appropriate amounts of polycarbosilane as an organosilicone polymer compound and phenol resin. Then, the dipped SiC fibers were heat treated in vacuum to form a film containing 22% by mole of SiC in C, as determined by the said Micro Augar Spectroscopy, and then integrated with the said $Si_3N_4$ powdery mixture. That is, 20% by volume of the fibers were arranged in a uniaxial direction and integrated with the $Si_3N_4$ powdery mixture to prepare a green body, 6 mm thick and 60 mm in diameter. Then, the green body was set in a graphite die in a hot press, and sintered in a nitrogen gas stream under a pressure of 300 kg/cm² at a maximum heating temperature of 1,800° C. In the same manner as above, a $Si_3N_4$ sintered product integrated with SiC fibers provided without the film on the surfaces of fibers was also prepared. These sintered products were cut in parallel to the fibers to obtain test pieces, 3 mm wide×4 mm thick×36 mm long. The test pieces were polished with grinding, and a notch, 0.1 mm wide and 0.5 mm deep, was provided at the center at an right angle to the fibers to prepare test pieces according to a single edge notched beam (SENB) procedure, and fracture toughness ($K_{1c}$) was determined.

Figure 18:
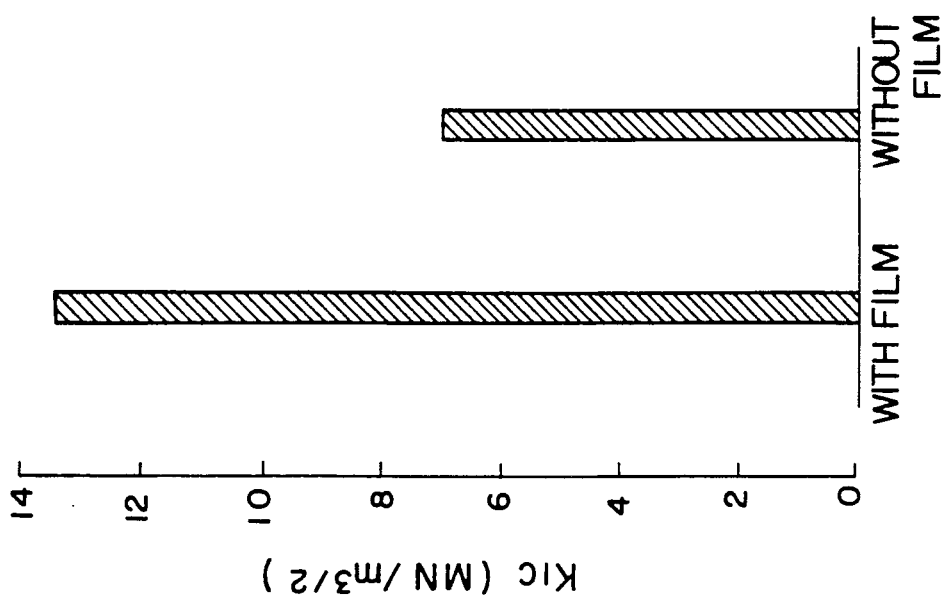

FIG. 18 is a diagram showing comparison of $K_{1c}$ ($MN/m^{3/2}$ on the axis of ordinate), where the test piece containing SiC fibers coated with a mixed film of C and SiC has a better toughness than that containing SiC fibers without the film.

Figure 19:
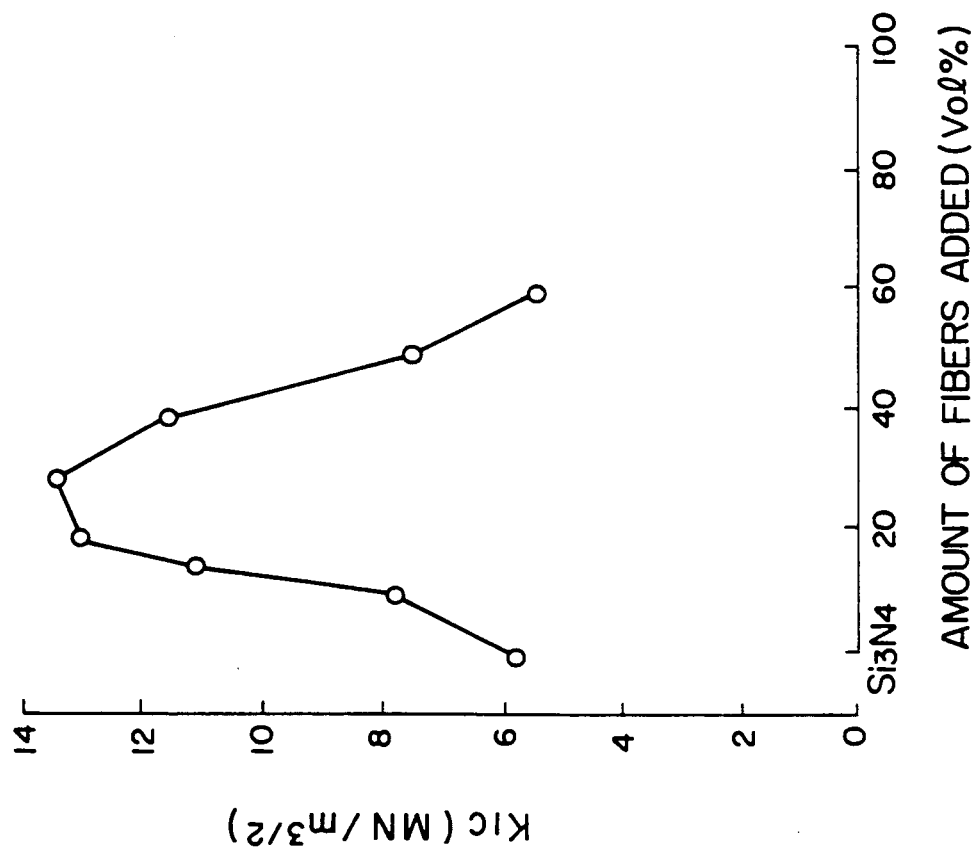

FIG. 19 is a diagram showing a relationship between the amount of SiC fibers added (% by volume on the axis of ordinate) and $K_{1c}$ ($MN/m^{3/2}$ on the axis of abscissa), where $K_{1c}$ of 10 $MN/m^{3/2}$ or more could be obtained with the amount of added SiC fibers of 15 to 45% by volume. Likewise tests were carried out with SiC fibers having diameters of 5, 10, 50, 200 and 300 μm. It was found that the effect was small with the fibers having a diameter of 300 μm, because the diameter of the fibers was too large, whereas similar effects to those of FIGS. 18 and 19 were obtained when the diameter was in a range of 10 to 200 μm. When the diameter was 5 μm, $K_{1c}$ was 10 $MN/m^{3/2}$.

Figure 20:
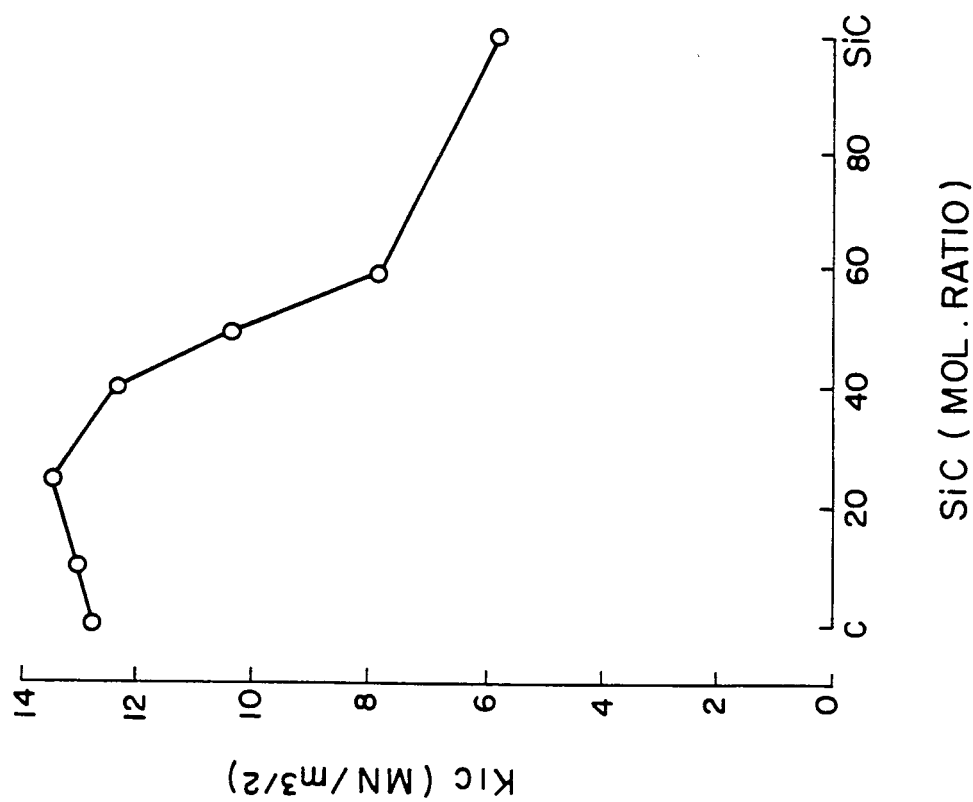
Figure 21:
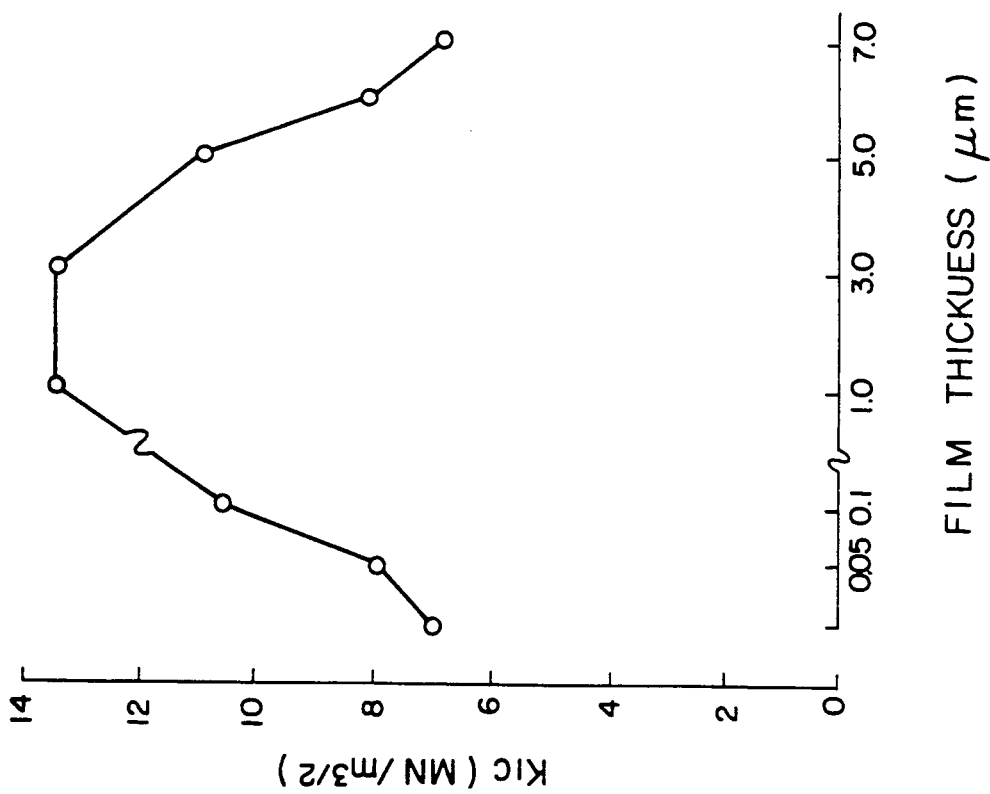

FIGS. 20 and 21 show the results of measuring $K_{1c}$ by changing the film composition and the film thickness. The film composition was adjusted by changing the mixing ratio of polycarbosilane to phenol resin. FIG. 20 is a diagram showing a relationship between SiC (molar ratio on the axis of abscissa) and $K_{1c}$ ($MN/m^{3/2}$ on the axis of ordinate) and FIG. 21 is a diagram showing a relationship between the film thickness (μm on the axis of abscissa) and $K_{1c}$ ($MN/m^{3/2}$ on the axis of ordinate). In FIG. 20 the film thickness was 1.0 μm, whereas in FIG. 21 the film composition had a molar ratio of SiC to C of 20:80. As is obvious therefrom, the improvement of toughness was remarkable with a film thickness of 0.1 to 5 μm and a film composition having a SiC content of not more than 50% by mole.

Example 12

Green bodies containing SiC fibers coated with a C film containing 20% by mole of SiC and having a thickness of 1 μm as uniaxially arranged were prepared in the same manner as in Example 11. By changing sintering conditions, integrated sintered products of $Si_3N_4$-SiC having different densities were prepared and their fracture toughness $K_{1c}$ was determined in the same manner as in Example 11.

Figure 22:
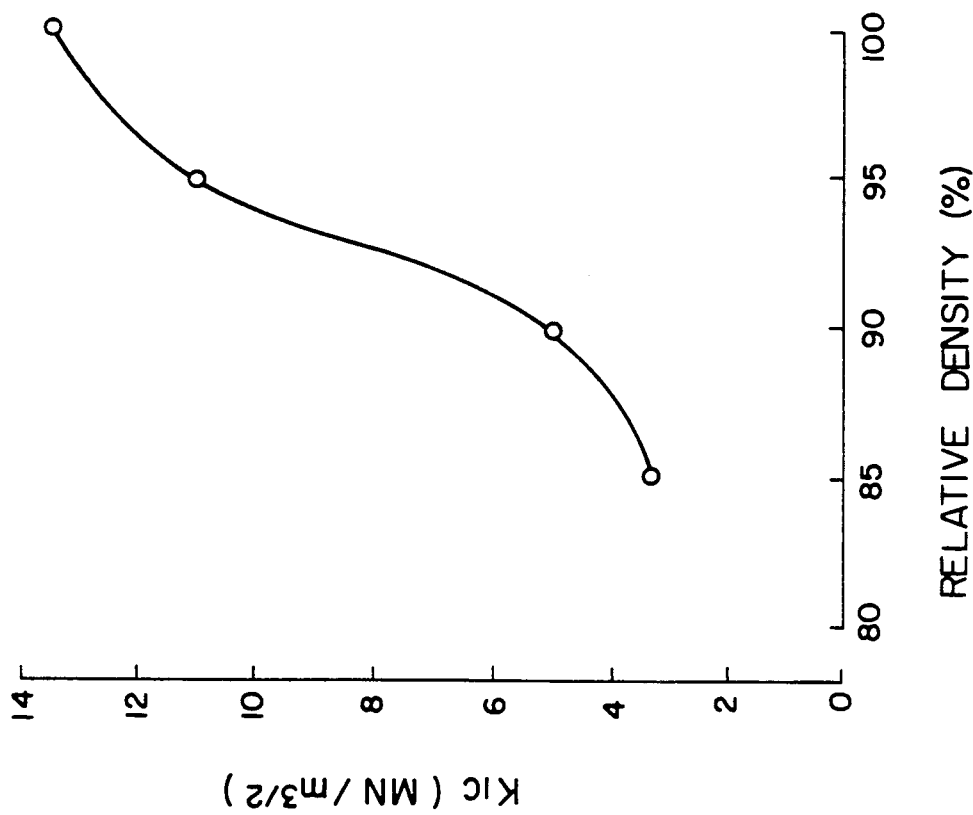

FIG. 22 is a graph showing a relationship between the relative density (% on the axis of abscissa) and $K_{1c}$ ($MN/m^{3/2}$ on the axis of ordinate). Improvement of toughness of sintered products having a relative density of 95% or more was remarkable, but those of lower relative density had a less effect. That is, to improve the toughness by fibers, it is preferable that the relative density of integrated sintered product is 95% or more. The bending strength of test pieces having a relative density of 100% was 80 kg/mm² or more at a temperature ranging from room temperature to 1,100° C.

Example 13

Integrated sintered products of $Si_3N_4$-SiC fibers containing SiC fibers having a diameter of 140 μm, coated with a C film containing 22% by mole of SiC, as arranged uniaxially, were prepared in the same manner as in Example 11, and test pieces for the single edge notched beam procedure were prepared therefrom. The test pieces were left standing in the air at 1,000° C. for 2,500 hours. Then, $K_{1c}$ was determined. It was found that substantially the same $K_{1c}$ values were obtained as before the oxidation test, and thus the test pieces had a good heat resistance.

Figure 23:
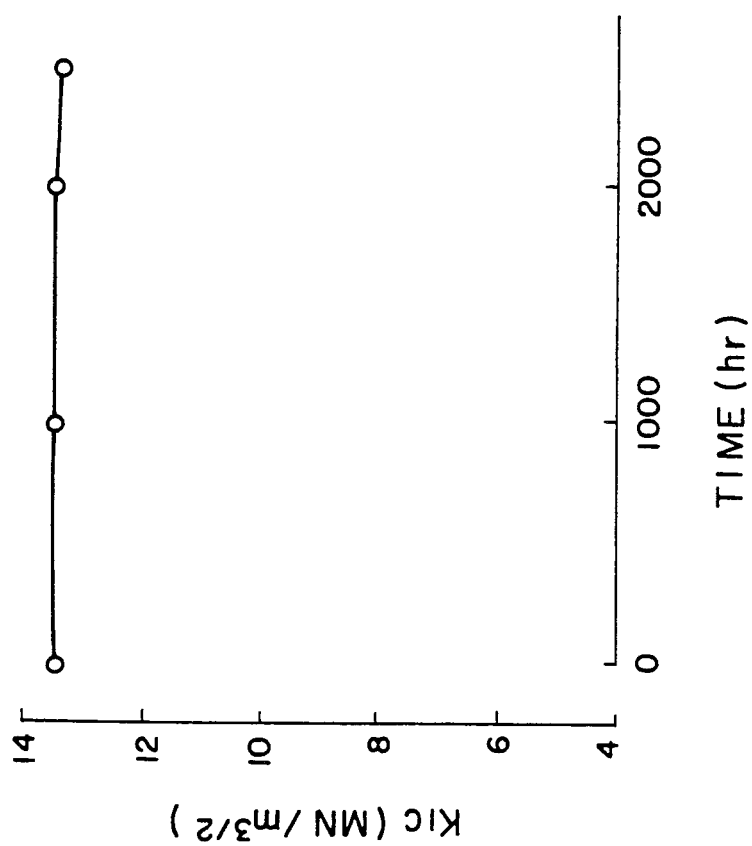

FIG. 23 is a diagram showing a relationship between the time (hour on the axis of abscissa) and $K_{1c}$ ($MN/m^{3/2}$ on the axis of ordinate), where a constant $K_{1c}$ of about 13.5 $MN/m^{3/2}$ was maintained even after heating for 2,500 hours, that is, a good heat resistance was attained.

When the C film had a SiC content of 10 to 50% by mole, a good oxidation resistance was likewise obtained.

Example 14

Figure 24:
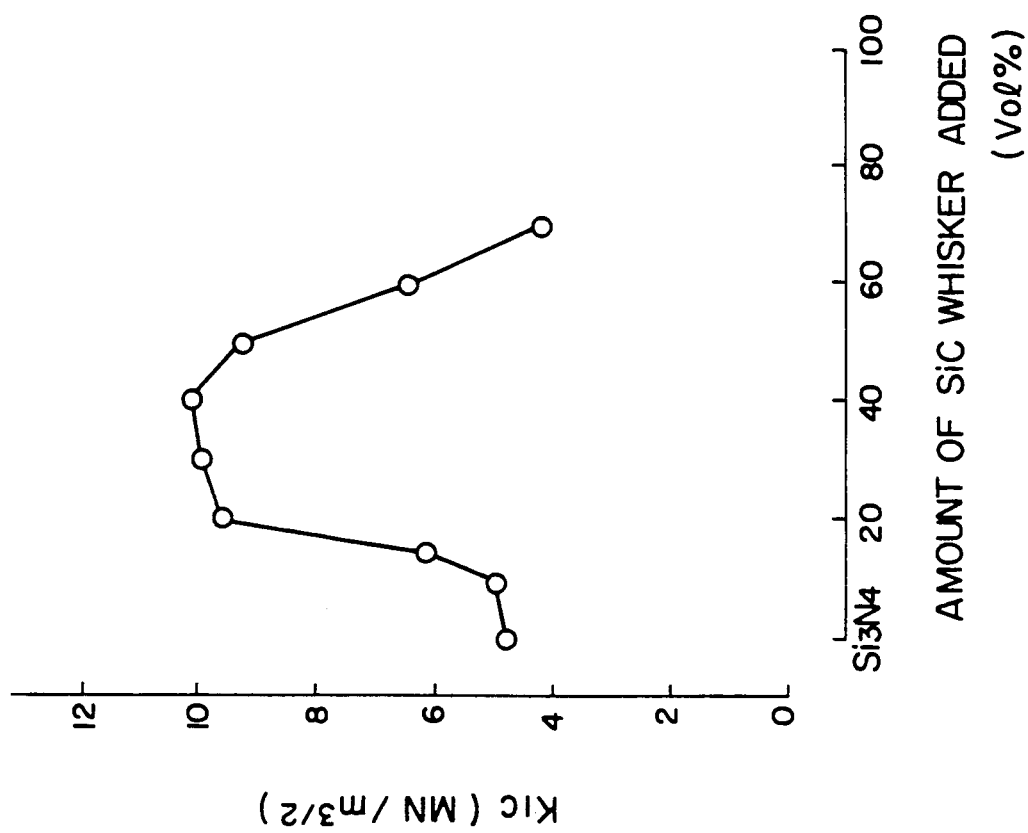

FIG. 24 is a diagram showing a relationship between the amount (% by volume) of SiC whiskers added to the $Si_3N_4$ sintered products containing SiC whiskers having diameters of 0.5 to 5 μm and an aspect ratio of at least 10, coated with a C film containing 10% by mole of SiC, as arranged at random and prepared in the same manner as in Example 11 and fracture toughness ($MN/m^{3/2}$). With an amount of added SiC whiskers of 20% by volume or more, a $K_{1c}$ of 9.5 $MN/m^{3/2}$ or more was obtained, and the toughness was considerably improved, whereas with the amount of added SiC whiskers of less than 15% by volume, its effect was small. Above 60% by volume of SiC whiskers added, its contribution to the toughness was small. Thus, an appropriate amount of the SiC whiskers for integration at random is 20 to 50% by volume, and 30 to 40% by volume is more effective. With 20 to 50% by volume of SiC whiskers added, a bending strength of 40 $kg/mm^2$ or more can be obtained.

Figure 25:
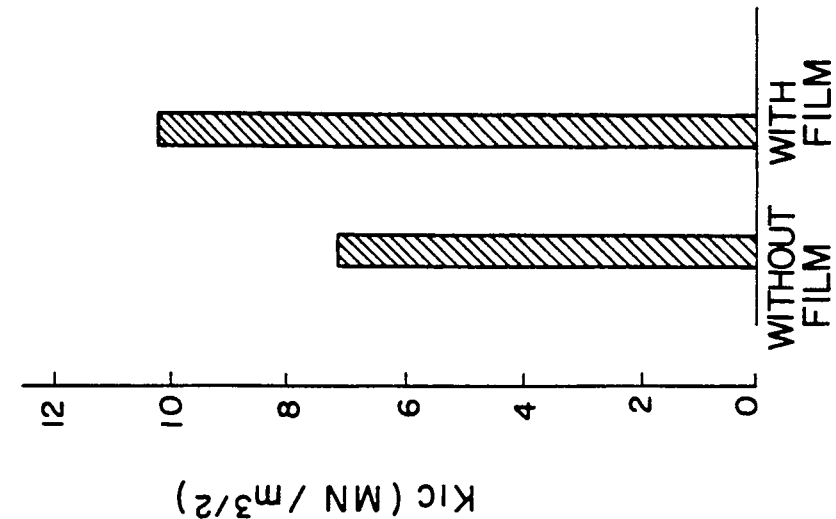

FIG. 25 shows results of $K_{1c}$ ($MN/m^{3/2}$) determination, depending on the presence of a C film containing 10% by mole of SiC on the SiC whiskers in sintered $Si_3N_4$ products containing 20% by volume of the SiC whiskers. As is obvious from FIG. 25 an improvement of toughness by the presence of a C film on the SiC whiskers can be obtained even if the SiC whiskers are arranged at random. Similar results were obtained with $Si_3N_4$ whiskers.

Example 15

Intergrated, sintered products of $Si_5AlON_7$ matrix containing SiC fibers having diameters of 5 to 300 μm, whose surfaces were coated with a C film containing 30% by mole of SiC and having a thickness of 1 μm were prepared, and their $K_{1c}$ were determined according to the single end notched beam procedure. The results are shown in the following Table.

TABLE

| Fiber diameter (μm) | $K_{IC}$ ($MN/m^{3/2}$) |
|---|---|
| 5.0 | 9.5 |
| 10 | 11.1 |
| 50 | 12.0 |
| 140 | 12.5 |
| 200 | 11.0 |
| 300 | 6.5 |

Particularly distinguished fracture toughness was obtained in a range of 10 to 200 μm, as in the case of $Si_3N_4$ matrix. Bending strength was also 70 $kg/mm^2$ or more.

Example 16

A gas turbine blade made from $Si_{5.5}Al_{0.5}O_{0.5}N_{7.5}$ having a tip end part in a structure of two-dimensional arrangement of SiC fibers having a diameter of 140 μm whose surfaces were coated with a C film having a thickness of 0.1 μm containing 20% by mole of SiC, as shown in FIG. 16 was prepared according to a hot isostatic press procedure in an Ar gas stream under 2,000 atmospheres at 1,800° C.

The blade was not damaged at all in a revolution test (10,000 rpm) in a gas at 1,350° C., a heat shock test alternately exposed to a hot gas and air, etc., and thus had a very high reliability.

What is claimed is:

1. Fiber-reinforced ceramics comprising at least one of fibers and whiskers distributed in a sintered ceramic matrix, the ceramic matrix being composed mainly of SiC, $Si_3N_4$ or $Si_{6-z}Al_zO_zN_{8-z}$ where $0<z\leq4$, the fibers and the whiskers consisting essentially of at least one of SiC, $Si_3N_4$, or $Si_{6-z}Al_zO_zN_{8-z}$ where $0<z\leq4$, and a coating film comprising C, B or BN containing 10–50 mol % of SiC or $Si_3N_4$ being provided on surfaces of the fibers and the whiskers; the coating film having a thickness of 0.1 to 5 μm, the diameter of fibers being in the range of 10 to 200 μm and the diameter of the whiskers being in the range of 0.5 to 5 μm.

2. Fiber-reinforced ceramics according to claim 1, wherein the fibers and the whiskers have an aspect ratio of 20 or more.

3. Fiber-reinforced ceramics according to claim 1, wherein at least one of the fibers and whiskers is arranged in one direction or in different directions from one layer to another, the fibers in each layer being arranged in one direction, in the ceramic matrix and wherein 5 to 35% by volume of at least one of the fibers and whiskers is contained within the ceramic matrix.

4. Fiber-reinforced ceramics according to claim 1, wherein at least one of the fibers and whiskers is arranged at random in the ceramic matrix and wherein 15 to 50% by volume of at least one of the fibers and the whiskers is contained within the ceramic matrix.

5. Fiber-reinforced ceramics according to claim 1, wherein, the ceramic matrix is composed mainly of $Si_3N_4$ or $Si_{6-z}Al_zO_zN_{8-z}$ where $0<z\leq4$, at least one member of the fibers and the whiskers is composed of SiC or $Si_3N_4$.

6. Fiber-reinforced ceramics according to claim 1, wherein the ceramic matrix is composed mainly of SiC, the fibers and the whiskers are composed of SiC and have a BN coating film containing SiC or $Si_3N_4$ thereon.

7. Fiber-reinforced ceramics according to any one of claims 1, 3 and 4, wherein the fibers and whiskers are made from fibers having a C fiber core and a coating of SiC.

8. Fiber-reinforced ceramics comprising at least one of fibers and whiskers distributed in a sintered ceramic matrix, the ceramic matrix being composed mainly of SiC, $Si_3N_4$, or $Si_{6-z}Al_zO_zN_{8-z}$ where $0<z\leq4$, the fibers and the whiskers consisting essentially of at least one of SiC, $Si_3N_4$, or $Si_{6-z}Al_zO_zN_{8-z}$ where $0<z\leq4$, a coating film comprising C, B or BN containing 10–50 mol % of SiC or $Si_3N_4$ being provided on surfaces of the fibers and the whiskers, and a ratio of distances l between fibers or the whiskers to diameter d of the fibers or the whiskers having the coating film, l/d, being 0.5 to 2; the coating film having a thickness of 0.1 to 5 μm, the diameter of the fibers being in the range of 10 to 200 μm and the diameter of the whiskers being in the range of 0.5 to 5 μm.

9. Fiber-reinforced ceramics according to claim 8, wherein 15 to 50% by volume of at least one member of the fibers and the whiskers is contained within the ceramic matrix.

10. Fiber-reinforced ceramics comprising at least one of fibers and whiskers distributed in a sintered ceramic matrix, the ceramic matrix being composed mainly of SiC, $Si_3N_4$ or $Si_{6-z}Al_zO_zN_{8-z}$ where $0<z\leq 4$, the fibers and the whiskers consisting essentially of at least one of SiC, $Si_3N_4$, or $Si_{6-z}Al_zO_zN_{8-z}$ where $0<z\leq 4$, a coating comprising C, B or BN containing 10–50 mol % of SiC or $Si_3N_4$ being provided on surfaces of the fibers and the whiskers, and the diameter of the fibers or the whiskers having the coating film being at least 5 times the average particle size of the sintered matrix and the length of the fibers or the whiskers having the coating film being at least 30 times the diameter of the fibers or the whiskers; the coating film having a thickness of 0.1 to 5 μm, the diameter of the fibers being in the range of 10 to 200 μm and the diameter of the whiskers being in the range of 0.5 to 5 μm.

11. Fiber-reinforced ceramics according to claim 10, wherein 15 to 50% by volume of at least one of the fibers and the whiskers is contained with the ceramic matrix.

12. Fiber-reinforced ceramics comprising at least one of fibers and whiskers distributed in a sintered ceramic matrix, the ceramic matrix being composed of SiC, $Si_3N_4$ or $Si_{6-z}Al_zO_zN_{8-z}$ where $0<z\leq 4$, the fibers and the whiskers consisting essentially of at least one of SiC, $Si_3N_4$, or $Si_{6-z}Al_zO_zN_{8-z}$ where $0<z\leq 4$, a coating film comprising C, B or BN containing 10–50 mol % SiC or $Si_3N_4$ being provided on surfaces of the fibers and the whiskers, said fiber-reinforced ceramics exhibiting a fracture toughness, $K_{1c}$, of at least 10 $MN/m^{3/2}$ and a bending strength at room temperature of at least 50 $kg/mm^2$; said coating film having a thickness of 0.1 to 5 μm, the diameter of the fibers being i the range of 10 to 200 μm and the diameter of the whiskers being in the range of 0.5 to 5 μm.

13. Fiber-reinforced ceramics comprising at least one of fibers and whiskers distributed in a sintered ceramic matrix, the ceramic matrix being composed mainly of $Si_3N_4$ and containing 1 to 20% by volume of at least one of $Al_2O_3$ and $Y_2O_3$, the fibers and the whiskers consisting essentially of at least one of SiC, $Si_3N_4$, or $Si_{6-z}Al_zO_zN_{8-z}$ where $0<z\leq 4$, and a coating film comprising C, B or BN containing 10–50 mol % SiC or $Si_3N_4$ being provided on surfaces of the fibers and the whiskers; the coating film having a thickness of 0.1 to 5 μm, the diameter of the fibers being in the range of 10 to 200 μm and the diameter of the whiskers being in the range of 0.5 to 5 μm.

14. Fiber-reinforced ceramics according to claim 13, wherein the fibers and the whiskers have an aspect ratio of at least 20.

15. Fiber-reinforced ceramics according to claim 13, wherein 5 to 35% by volume of at least one of the fibers and the whiskers is contained within the ceramic matrix.

16. Fiber-reinforced ceramics consisting essentially of at least one of fibers and whiskers distributed in a sintered ceramic matrix, the ceramic matrix being composed mainly of SiC, $Si_3N_4$ or $Si_{6-z}Al_zO_zN_{8-z}$ where $0<z\leq 4$, the fibers and the whiskers consisting essentially of at least one of SiC, $Si_3N_4$, or $Si_{6-z}Al_zO_zN_{8-z}$ where $0<z\leq 4$, and a coating film of C, B or BN containing 10–50 mol % SiC or $Si_3N_4$ being provided on surfaces of the fibers and the whiskers; the coating film having a thickness of 0.1 to 5 μm, the diameter of the fibers being in the range of 10 to 200 μm and the diameter of the whiskers being in the range of 0.5 to 5 μm.

17. Fiber-reinforced ceramics according to claim 16, wherein the fibers and the whiskers have an aspect ratio of at least 20.

18. Fiber-reinforced ceramics comprising at least one of fibers and whiskers distributed in a sintered ceramic matrix, the ceramic matrix being composed mainly of SiC, $Si_3N_4$, or $Si_{6-z}Al_zO_zN_{8-z}$ where $0<z\leq 4$, or the ceramic matrix being composed mainly of at least one of SiC and $Si_3N_4$ and containing 1 to 20% by volume of at least one of $Al_2O_3$ and $Y_2O_3$, the fibers and the whiskers consisting essentially of at least one of SiC, $Si_3N_4$, or $Si_{6-z}Al_zO_zN_{8-z}$ where $0<z\leq 4$, a coating film comprising C, B or BN containing 10–50 mol % of SiC or $Si_3N_4$ being provided on surfaces of the fibers and the whiskers, and a ratio of distances l between the fibers or the whiskers to diameter d of the fibers or the whiskers having the coating film, l/d, being 0.5 to 2 and the diameter of the fibers or the whiskers having the coating film being at least 5 times the average particle size of the sintered matrix and the length of the fibers or the whiskers having the coating film being at least 30 times the diameter of the fibers or the whiskers; the coating film having a thickness of 0.1 to 5 μm, the diameter of the fibers being in the range of 10 to 200 μm and the diameter of the whiskers being in the range of 0.5 to 5 μm.

19. Fiber-reinforced ceramics according to claim 1, which constitutes at least one of a blade part of gas turbine blade, a disc head of main stream block valve for BWR, and a blade of turbocharger.

* * * * *